April 4, 1961   F. C. WILLIAMS ET AL   2,978,623
ALTERNATING CURRENT MOTORS
Filed Nov. 9, 1959   5 Sheets-Sheet 1
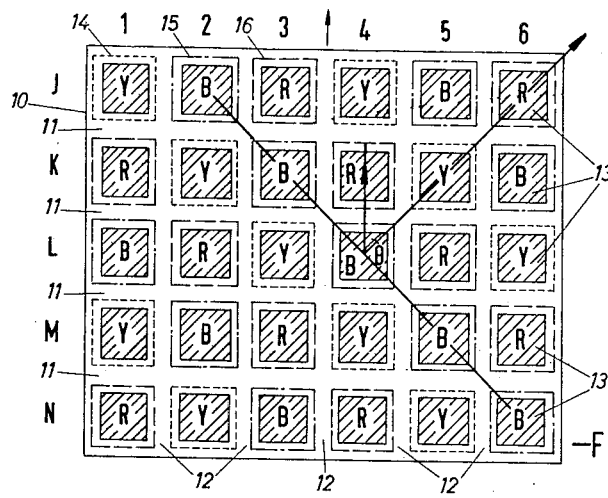
—FIG. 1.—
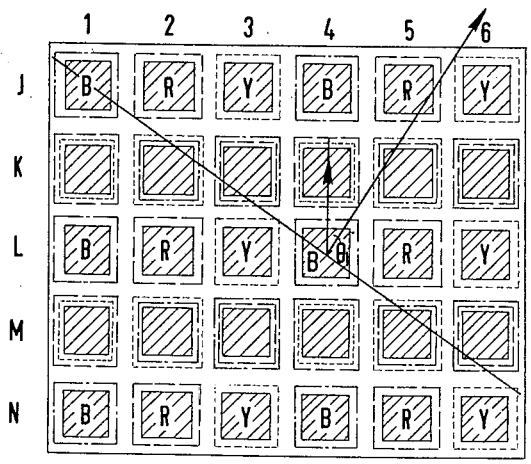
—FIG. 2.—
| J | 100% PC1 | | | | | | |
|---|---|---|---|---|---|---|---|
| K | 58% PC1 | | | | | | | 42% MAINS |
| L | 20% PC1 | | | | | | | 80% MAINS |
| M | 20% PC2 | | | | | | | 80% MAINS |
| N | 58% PC2 | | | | | | | 42% MAINS |
| O | 100% PC2 | | | | | | |
—FIG. 3.—
INVENTORS
FREDERIC CALLAND WILLIAMS
ERIC ROBERTS LAITHWAITE
BY
Stevens, Davis, Miller + Mosher
ATTORNEYS

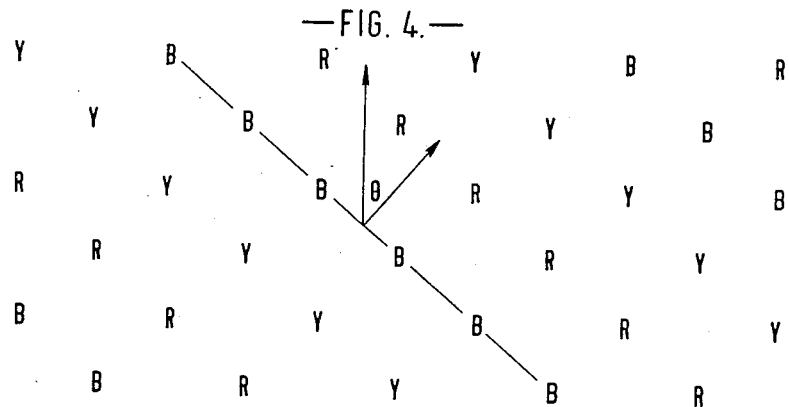
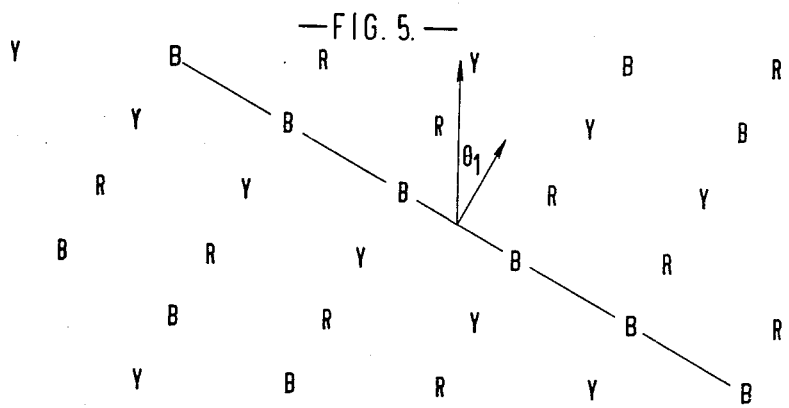
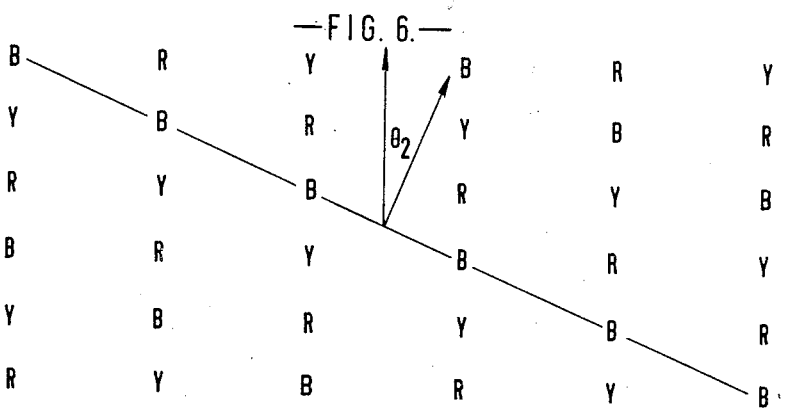

April 4, 1961  F. C. WILLIAMS ET AL  2,978,623
ALTERNATING CURRENT MOTORS
Filed Nov. 9, 1959  5 Sheets-Sheet 3
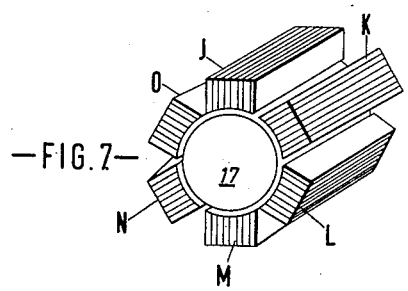
—FIG. 7—
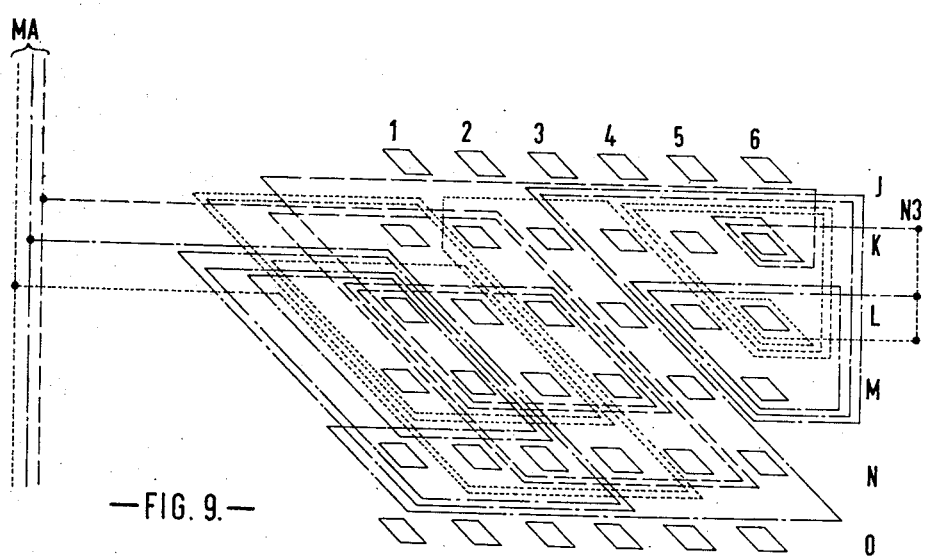
—FIG. 9.—
INVENTORS
FREDERIC CALLAND WILLIAMS
ERIC ROBERTS LAITHWAITE
BY
Stevens, Davis, Miller & Mosher
ATTORNEYS

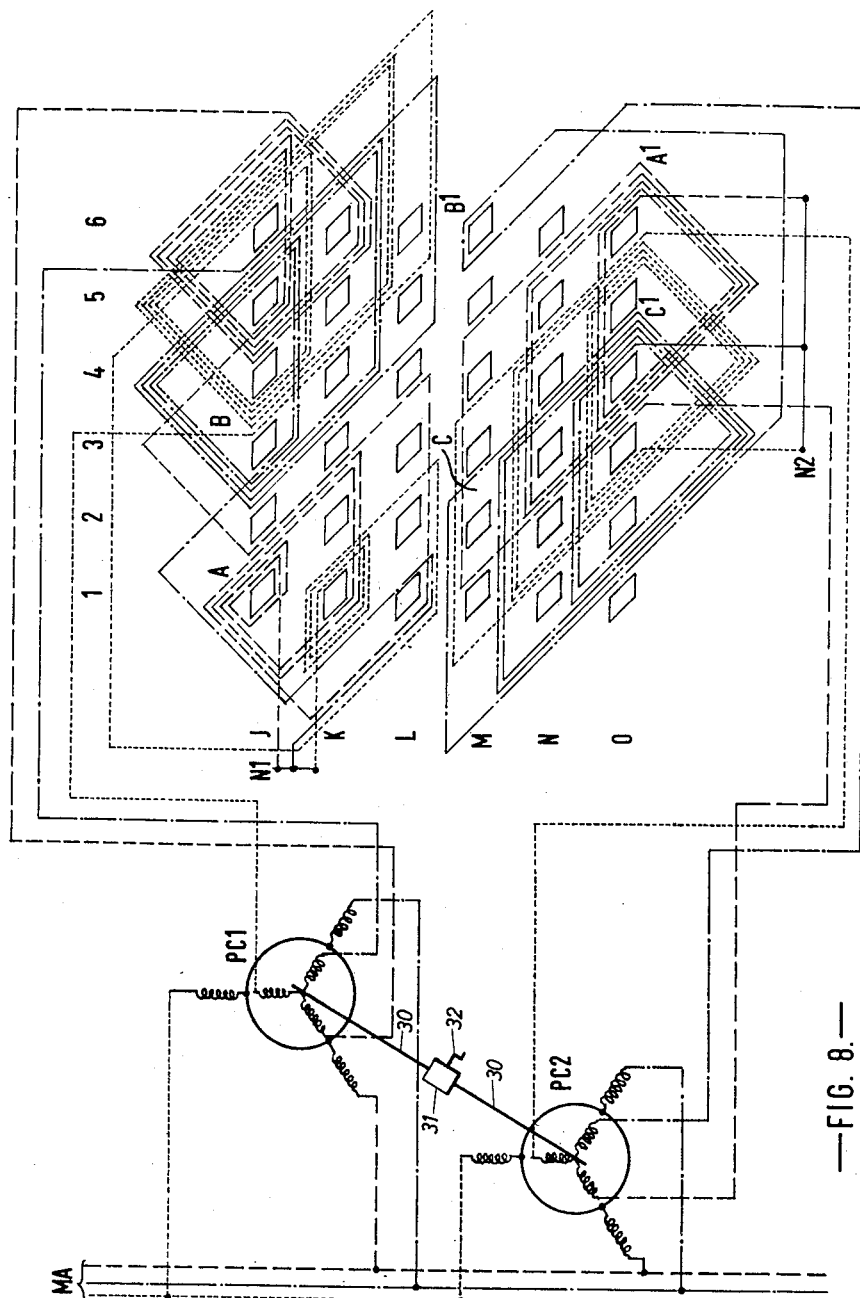
—FIG. 8.—

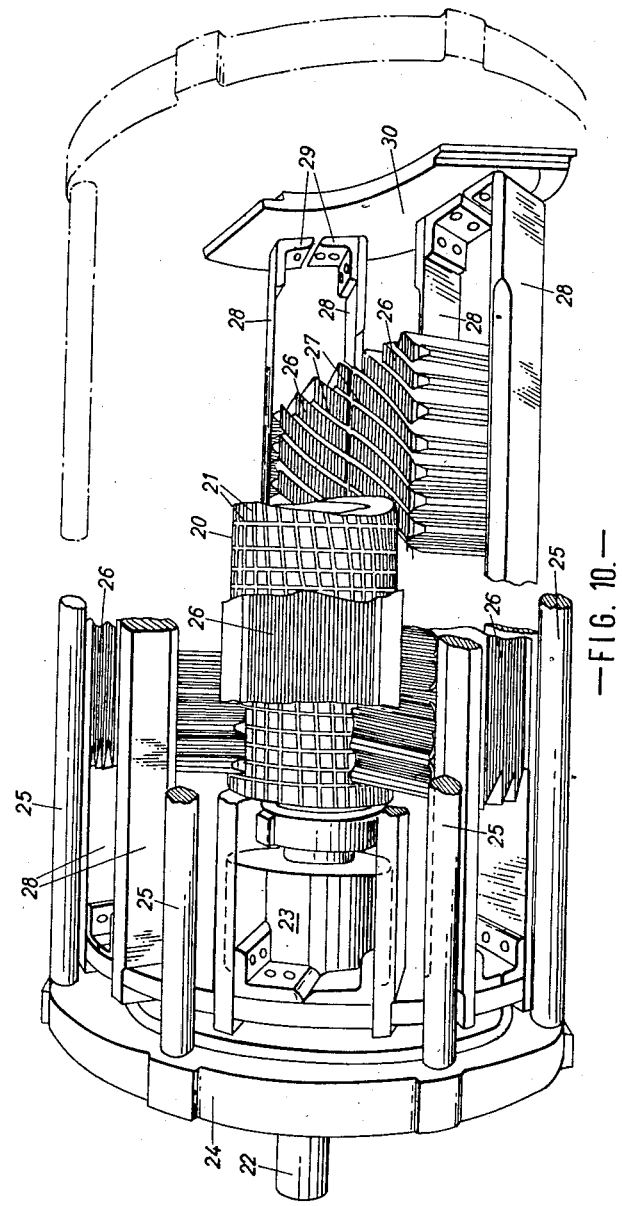

United States Patent Office 2,978,623
Patented Apr. 4, 1961

2,978,623

ALTERNATING CURRENT MOTORS

Frederic Calland Williams, Romily, and Eric Roberts Laithwaite, Manchester, England, assignors to National Research Development Corporation, London, England, a corporation of Great Britain Filed Nov. 9, 1959, Ser. No. 851,773

Claims priority, application Great Britain May 4, 1955

9 Claims. (Cl. 318—195)

This application is a continuation in part of our application Serial No. 582,820.

The present invention relates to alternating current motors and is more particularly concerned with induction motors capable of continuous speed variation.

In our prior United States Patent No. 2,856,573 an induction motor has been described which is capable of continuous speed variation due to the provision of electromagnetic means in association with the stator, the electromagnetic means being so arranged as to give rise to a row of magnetic poles of alternately north and south polarity, the poles moving in a direction which in one case may be in the direction of movement of the rotor. In this particular case, the rotor would move at substantially the same speed as the magnetic poles. It is shown in the complete specification cognating the two above-mentioned applications that if the electromagnetic means are moved so that the direction of movement of the magnetic poles makes an angle with the direction of movement of the rotor, the speed of movement of the rotor would increase. Further if $\theta$ is the angle between the direction of movement of the poles and the direction of movement of the rotor, it is shown that the velocity of the rotor is given ideally by $$\frac{\mu}{\cos \theta}$$

where $\mu$ is the velocity of the moving poles.

It will thus be seen that speed variation is effected in accordance with the prior invention by varying the direction of movement of the moving poles with respect to the rotor and this is effected by angular movement of the electromagnetic means giving rise to the moving poles. While the description of the prior specification makes use of the conception of moving magnetic poles, it is believed that the present invention will be more easily understood by the use of the conception of a moving magnetic field and accordingly this expression will be employed hereinafter.

The object of the present invention is to provide a continuously variable speed induction motor in which the variation in the direction of movement of the magnetic field with respect to the rotor is effected without the necessity of angular movement of the electromagnetic means. It is an advantage of this arrangement that cylindrical rotors can then be used since no mechanical displacement of the stator is required.

According to the invention the variation in the direction of movement of the magnetic field with respect to the direction of movement of the rotor is effected in an electrical manner by varying the phase of the current supplied to the windings which give rise to the moving magnetic field.

The invention will be better understood from the following description taken in conjunction with the accompanying drawings comprising Figs. 1 to 10. In the drawings.

Figs. 1 and 2 show diagrammatically the stator of the machine according to the invention, Fig. 3 shows diagrammatically the manner of feeding current from phase changers to the stator of the machine according to the present invention, Figs. 4, 5 and 6 are explanatory diagrams showing the effect of feeding the stator coils from the phase changers, Fig. 7 shows one form of the machine according to the invention, Figs. 8 and 9 show one method of winding the stator coils fed by current from the phase changers and the mains in the manner shown in Fig. 3, and Fig. 10 shows a constructional form of the motor according to the present invention.

The development of the invention from that described in the prior specification will first be discussed in conjunction with Figs. 1 and 2. These two drawings show diagrammatically an electromagnetic means as defined in the prior specification, that is to say, a stator 10 arranged to cooperate with the rotor. It will, of course, be understood that in practise the stator will be curved since the rotor will be cylindrical but for simplicity no indication of curvature is shown in the drawings. The stator consists of a laminated ferromagnetic structure which is provided with transverse and longitudinal slots 11 and 12 respectively so as to form polepieces 13. An individual coil, such as 14, 15 and 16, is wound on each polepiece and to facilitate the description the references J, K, L, M and N are applied to the rows of coils while the references 1, 2, 3, 4 and 5 are applied to the columns. With this notation, coils 14, 15 and 16 would be referred to as coils J1, J2 and J3 respectively.

The coils are fed from a three-phase supply and an indication of the phase current flowing through a particular coil is given by the outline of the coil. Thus as shown in Fig. 1, coil J1 is shown by a dotted line indicating that it is a yellow phase coil or Y coil; coil J2 is shown by a dot-dash line indicating that it is a blue phase coil or B coil while coil J3 is shown by a dash-dash line indicating that it is a red phase coil or R coil and so on for the remaining coils.

It will be seen that the diagonally situated B coils, J2, K2, L4, M5 and N6 and the diagonally situated R and Y coils will give rise to a travelling magnetic field which makes an angle $\theta$ with the direction of movement of the rotor, which direction is indicated by the vertical arrow.

Now assume that, the connections to the coils of row L remaining the same as that shown in Fig. 1, the connections to the coils of row J are retarded by one phase and those to row N are advanced by one phase as shown in Fig. 2. Actually it will be understood that the terms "advanced" and "retarded" are purely relative but are appropriate to describe the action. With this method of energisation of the coils the position will be as shown in Fig. 2 as regards rows J, L and N. It will now be seen that the angle $\theta$, which the travelling magnetic field makes with the direction of movement of the rotor is less than in the case of Fig. 1 and further the pole-pitch in the direction of movement of the magnetic field is also reduced so that the velocity of the rotor is reduced. As regards the coils in rows K and M, it will be obvious that in order to avoid distortion of the magnetic field, the phase change in the current flowing in these coils will have to be less than 120 deg. which represents the change from one phase to the next. In order to enable this to be done, the coils of rows K and M are divided into two sections, both sections of a coil being fed in the same phase for the condition shown in Fig. 1 while the two sections are fed with different phase currents as indicated for the condition shown in Fig. 2. In fact, for the arrangement shown in Fig. 2, the two sections will have the same number of turns but it will be appreciated that other arrangements may be provided where the number of turns is different for the two sections.

It will of course be understood that the showing in Figs. 1 and 2 is very diagrammatic. As in the case of conventional polyphase windings, the coils of the successive phases will overlap and further the coils of, for instance, the B and R phases may be separated by a —Y phase coil. Similarly a —R phase coil may be interposed between a Y and B coil and —B phase coil between an R and Y coil. This will not, however, in any way alter the underlying idea of the invention.

It will also be appreciated that the arrangements so far described in Figs. 1 and 2 will provide two discrete speeds which is obviously a serious limitation. Hence in order to obtain continuous speed variation, it is necessary to provide arrangements which will provide for continuous variation of the phase of the currents supplied to the coils.

This may be done by supplying row J and the appropriate sections or half coils in row K from a phase shifter capable of advancing the phase progressively up to a maximum of, say, 120 deg. and supplying row N and the appropriate half coils in row M from a second phase shifter which simultaneously and progressively retards the phase again up to a maximum of 120 deg. However, phase shifting wholly in one direction by each phase shifter is not the optimum arrangement because the resultant field due to rows K and M for angles of the phase shifter other than zero is obtained by vector addition in the well known manner. Accordingly, the magnitude of the field produced by rows K and M is reduced in relation to the magnitude of the field produced by rows J, L and N as the angle of the phase shifters is increased from zero. It is therefore preferable to shift ±60 deg., for instance, with each phase shifter.

Reference will now be made to Fig. 3 which illustrates a preferred arrangement over Fig. 2. In this arrangement six rows of coils J to O are provided and the arrangement requires two phase changing mechanisms PC1 and PC2 which provide phase shift in opposite directions. In a preferred embodiment the coils in rows J and O consist of single coils as shown in Fig. 1 and are fed entirely from the phase changers. The coils of rows K to N are formed in two sections and as regards the row K, the coils are fed as to 58% from phase changer PC1 and as to 42% from the mains. The manner of feeding the coils of rows L to N is as shown in the drawing, the individual coils and the connections thereto having been omitted from Fig. 3 for simplicity. The phase changers are arranged to be operated together and are such that the maximum phase change is ±90 deg. occurring on rows J and O since the coils of rows J and O are fed entirely from the two phase changers. As regards the coils of rows K and M these are fed partly from one phase changer and the mains in the proportion of 58% and 42% respectively. The maximum phase change on rows K and M with respect to the mains will occur when the phase changers are adjusted to introduce a phase change of 90 deg. with respect to the mains. This maximum phase change is obtained by the addition of the two vectors representing mains current and current from the appropriate phase changer and will be given by the angle whose tangent is $$\frac{58}{42}$$

i.e. 54 deg.

The coils in the various rows are so wired and placed as to yield the pattern of Fig. 5 when the phase changers are set to 0 deg. With this arrangement the effects of the different coils and half coils combine to give rise to a travelling magnetic field as indicated in Figs. 4, 5 and 6 which show the configurations for three positions of the phase changers. Thus Fig. 4 shows the configuration with the phase changer PC1 fully advanced and the phase changer PC2 fully retarded; Fig. 5 shows the configuration with the phase changers in the zero position while Fig. 6 shows the configuration with phase changer PC1 fully retarded and phase changer PC2 fully advanced. It will be seen from a consideration of these three figures that the angle between the direction of movement of the travelling magnetic field and the direction of movement of the rotor is at its maximum value $\theta$ in Fig. 4 and decreases through $\theta_1$, of Fig. 5 to the minimum value $\theta_2$ in Fig. 6. The rotor thus has its maximum speed with the configuration of Fig. 4 and its minimum speed with the configuration of Fig. 6, the pole spacing effectively increasing between the configurations of Figs. 4 and 6. It should also be explained that the configurations of Figs. 4 and 5 allow for the provision of the negative phase coils previously mentioned so that actually the reference —R should be inserted between references Y and B in the rows and so one for the other phases. It will be noted that the preferred embodiment gives a speed ration of 2 : 1 as between the configurations of Figs. 4 and 6 since the configuration of Fig. 4 is effectively a two pole machine, while that of Fig. 6 is effectively a four-pole machine.

It will be appreciated that increasing the number of rows of coils serve to reduce distortion in the resulting magnetic field pattern and the preferred arrangement shown in Fig. 3 illustrates the way in which the rows are fed in a six-row stator. The invention is, however, not limited to the use of a six-row stator and the limiting factor in the number of rows is largely economic. If the rows of coils are arranged completely around the periphery of a cylindrical rotor, then the speed range is from 3000 r.p.m. down to 1500 r.p.m. for a 50 c.p.s. supply. It will, of course, be appreciated that by moving the phase changers by more than 90 deg. in the low speed direction even lower speeds can be obtained.

The spacing of the six rows of coils around the rotor is not critical and one set of rows as shown in Fig. 3, may cover the whole periphery of the rotor, as previously mentioned, or only a part of it. In the latter case more than one set of rows may be used if desired. The stator laminations for the former construction are shown diagrammatically in Fig. 7 arranged around the rotor 17 from which it will be noted that the laminations are at right angles to those in a conventional motor.

The phase changers of of known type and each consists as shown in Fig. 8 essentially of an induction motor with a three-phase wound stator and a three-phase wound rotor mounted coaxially within the stator and arranged for rotation with respect thereto. The stator winding is energised from the mains supply M and the outputs of the phase changer are connected to the phase coils of the rotor. When the phase coils of the rotor are opposite to corresponding coils of the stator as shown in Fig. 8, the phase difference between the output currents and the mains supply currents is zero. When the rotor is rotated, the relative movement between the stator coils and the rotor coils will introduce a phase difference between the output currents and the mains currents and this difference will be opposite (positive or negative) for opposite directions of relative movement between stator and rotor.

The rotors of the two phase changers PC1 and PC2 for use with the present invention are preferably mounted on the same shaft 30 and the stator windings of the two phase changers are so arranged that rotaton of the common shaft, by operation of the handle 32 acting through gearing 31, causes the same phase change in opposite directions to the outputs of the two phase changers, i.e. for a given rotation, the phase difference between the mains currents and the output currents of one phase changer is $+\theta$, that between the mains currents and the output currents of the other phase changer will be $-\theta$.

In the preferred embodiment of the invention, six sets of coils are employed as shown in Fig. 7, the proportion of current supplied to the rows of coils from the mains and from the phase changers being as shown in Fig. 3. The slots which accommodate the coils are cut at 45 deg. with respect to the direction of movement of the rotor for ease of winding and economy of wire. Figs. 8 and 9 show one method of arranging the coils of the stator. In order to simplify the drawings, the stator winding has been shown in two parts of which Fig. 8 shows the coils which are fed from the phase changers PC1 and PC2 while Fig. 9 shows the coils which are fed from the mains. The complete winding is therefore obtained by superposing Figs. 8 and 9. The three phases in Figs. 8 and 9 are indicated in the same way as in Figs. 1 and 2 and the phase leads are connected to neutral points N1, N2 in Figs. 8 and N3 in Fig. 9. It should be mentioned that again for simplicity Figs. 8 and 9 show one slot per pole per phase whereas in practise it is more likely that two slots per pole per phase would be used.

Referring first to Fig. 8, it will be seen that five conductors, fed by current of the same phase from the phase changer PC1, are placed in each of the slots of row J. Three conductors, fed by current of the same phase from the phase changer PC1, are placed in each of the slots of row K while referring to Fig. 9 two conductors, fed by current of the same phase from the mains, are also placed in each of the slots of row K. One conductor fed by current from the phase changer PC1, is placed in each of the slots of row L while again referring to Fig. 9, four conductors, fed by current of the same phase from the mains, are also placed in each of the slots of row L. The total number of conductors in all slots of all the rows J, K and L is thus five. The conductors in the slots of rows M, N and O are similarly arranged to those in rows L, K and J respectively and carry currents supplied by the mains and the phase changer PC2. It is however essential that these conductors in a slot A—A' which extends right across the stator block carry currents of the same phase and the current is in the same direction in those conductors.

If now the phase changer PC1 is set to zero angle of phase shift relative to the mains, the conductors of a slot such as A—A', will carry a uniphase current throughout the length of the slot. If the phase shifters are offset from the zero setting, there will be a progressive change of phase of the effective currents in the conductors of each slot such as A—A' from one end of the slot to the other. Thus there will be a slot in row J the conductors of which have currents flowing in them which has the same phase as the mains current but this slot will be displaced from the slot A—A' to, say, the slot B—B'. Similarly there will be a slot in row O the conductors of which have current flowing in them which has the same phase as the mains current but this slot will be displaced from the slot A—A' to the slot C—C'. Therefore the effect of moving the phase changers from the zero setting will be to change the direction of the moving magnetic field with respect to the direction of rotation of the rotor and thereby to change the speed of rotation of the rotor.

One constructional form of the motor according to the invention is shown in Fig. 10 which is a perspective view with some of the parts broken away. Further the stator winding has been omitted for the sake of clarity. The rotor 20, which is of the squirrel cage type, consists of a cylindrically shaped structure of ferromagnetic material having a mesh 21 of high conductivity material, such as copper, embedded therein. The rotor is mounted on a shaft 22 for which bearings 23 are provided with end plates 24, the end plates being secured together by spacing rods 25. Only one of the bearings 23 is shown in the drawings. The stator is formed of six blocks 26 of which five only are visible in Fig. 10, the blocks being arranged in the manner shown in Fig. 7 and corresponding to the six rows shown in Fig. 3. Each blocks is formed of laminations of ferromagnetic material and is provided with slots 27 making an angle of 45 deg. with the rotor axis. The laminations extend axially of the motor and for each block are bolted between members 28 which in turn are bolted to angle irons 29 which are themselves bolted at each end to one sector 30 of an annular mounting plate. Two such blocks are mounted between a pair of sectors and three sectors form the complete plate. The adjoining edges of the sectors are rebated and are bolted together, the inner ring embracing and being suitably secured to the bearings 23.

As in the case of the motor described in our previously mentioned copending application, the motor according to the present invention can also be used as a reversible variable torque transmission device since in the present case, torque is approximately proportional to $\theta$ over a substantial range of angles centred on the 90 degree position.

The phase shifters employed in the present invention preferably consist of two induction motors having their rotors mounted on a common shaft, the two outputs being taken from sliprings, one set being associated with each motor. With appropriate connections between the stators and the supply the arrangement is a balanced one and no torque is present to cause rotation of the common shaft. If, however, the arrangement is unbalanced, for instance by providing the coils fed by one phase shifter with fewer turns than the coils fed by the other phase shifter, the common shaft will tend to rotate. If the shaft is arranged for limited rotation, for instance by providing a pin on the shaft which engages with a stop fixed in a predetermined position relative to the pin, and if the movement of the shaft is arranged to take place against a spring force, for instance by securing a spring between a fixed position and the pin, the arrangement will act as a torque controller. It is arranged that on starting the high current fed from the phase shifters will rotate the common shaft until the pin engages with the stop, at which position the arrangement provides a magnetic field pattern which causes low speed and high torque to be developed. As the speed builds up, the current delivered by the phase shifters is reduced and the force due to the unbalance is correspondingly reduced, so that the spring moves the pin away from the stop thus providing a magnetic field pattern which causes the speed to increase. It will be appreciated that such an arrangement could be employed in place of a gear box for transmitting power from the engine of a vehicle to the wheels, the spring being connected to an accelerator instead of to a fixed point and alternator being driven by the engine to supply power to the phase shifters.

It will be understood that the invention is in no way limited to the particular arrangement shown in the drawings as described previously. The invention includes within its scope any induction motor in which a moving magnetic field is generated the direction of which makes an angle with the direction of movement of the rotor and the angle is capable of variation by the use of electrical means.

We claim:

1. An alternating current machine comprising a cylindrical rotor, at least one stator member comprising a laminated structure, the planes of the laminations passing substantially through the axis of said rotor and having a set of coils arranged in rows to provide a moving magnetic field when said coils are connected to a source of polyphase alternating current thereby causing rotation of said rotor, and means for continuously varying the phases of the currents supplied to the different coils in each row and to corresponding coils in different rows to enable the direction of movement of said moving magnetic field relative to the direction of movement of said rotor and hence the speed of rotation of said rotor to be continuously controlled.

2. An alternating current machine as claimed in claim 1 wherein the number of coils is an integral multiple of the number of current phases.

3. An alternating current machine comprising a rotor, at least one stator member having a set of coils arranged in a plurality of rows to provide a moving magnetic field when said coils are connected to a source of polyphase alternating current thereby causing rotation of said rotor, a phase-changing device also connected to said source of polyphase current, means for controlling said phase-changing device to provide polyphase currents the phases of which are similarly adjustable in opposite directions with respect to the phases of the source of polyphase alternating current means feeding said polyphase currents of oppositely-directed phase to the coils of the end rows of said set of coils and means feeding said polyphase currents of oppositely-directed phase and polyphase current from said source in varying proportions to the coils of the intermediate rows of said set of coils whereby continuous variation in the control of said phase-changing device enables the direction of movement of the moving magnetic field with respect to the direction of movement of the rotor and hence the speed of the rotor to be continuously varied.

4. An alternating current machine comprising a rotor, at least one stator member having a plurality of poles and a set of coils at least one for each pole, said coils being arranged in a plurality of rows to provide a moving magnetic field when said coils are connected to a source of polyphase alternating current thereby causing rotation of said rotor, first and second phase-changers also connected to said source of polyphase current, means for continuously controlling said phase-changers in common to give polyphase currents the phases of which are similarly adjustable in opposite directions with respect to the phases of the source of polyphase alternating current, means feeding the polyphase current from said first phase-changer to the coils of one end row of said set, means feeding the polyphase current from said second phase-changer to the coils of the other end row of said set and means feeding the polyphase currents from said first and second phase-changers and from said source in varying proportions to the coils of the intermediate rows of said set of coils whereby continuous variation in the control of said phase-changers enables the direction of movement of the moving magnetic field with respect to the direction of movement of the rotor and hence the speed of the motor to be continuously varied.

5. An alternating current machine as claimed in claim 4 wherein the coils in each of the intermediate rows are formed in two separate parts, one of which is connected to one of said phase-changers while the other is connected to said source.

6. An alternating current machine as claimed in claim 4 wherein the stator coils are housed in slots in the stator, there being two slots for each stator pole and for each phase of the supplied current.

7. An alternating current machine as claimed in claim 4 wherein the stator member extends over a part of the periphery of the rotor.

8. An alternating current machine as claimed in claim 4 wherein the stator member extends over substantially the whole of the periphery of the rotor.

9. An alternating current machine as claimed in claim 4 wherein a plurality of stator members are employed equally spaced about the periphery of the rotor.

No references cited.